United States Patent [19]

Yamada

[11] Patent Number: 4,651,424

[45] Date of Patent: Mar. 24, 1987

[54] CHAIN SAW GUIDE BAR

[76] Inventor: Tetsuo Yamada, 1806-214, Ohshima, Shirotori-cho, Gujo-gun, Gifu Prefecture, Japan

[21] Appl. No.: 631,108

[22] Filed: Jul. 16, 1984

[30] Foreign Application Priority Data

Jul. 28, 1983 [JP] Japan .......................... 58-117757[U]

[51] Int. Cl.[4] .............................................. B23D 57/02

[52] U.S. Cl. ........................................ 30/387; 30/383; 30/384

[58] Field of Search .................. 30/387, 384, 385, 383

[56] References Cited

U.S. PATENT DOCUMENTS 4,259,793 4/1981 Scott-Jackson et al. ............ 30/384
4,381,606 5/1983 Ekrud et al. .......................... 30/387
4,486,953 12/1984 Halverson ......................... 30/387 X
4,489,493 12/1984 Tsmura ............................ 30/387 X

FOREIGN PATENT DOCUMENTS 850803 7/1949 Fed. Rep. of Germany ........ 30/387

*Primary Examiner*—E. R. Kazenske
*Assistant Examiner*—Willmon Fridie, Jr.
*Attorney, Agent, or Firm*—Wenderoth, Lind & Ponack

[57] ABSTRACT

A chain saw guide bar comprises a guide bar body and a nose assembly coupled to an end of the guide bar body, the guide bar body having a longitudinal tongue projecting centrally from an end thereof and thinner core plates extending laterally from opposite sides of the tongue, the nose assembly being composed of a pair of side plates having recesses defined centrally in tail ends thereof and receiving the tongue fitted therein, the body and the nose assembly being coupled together by rivets inserted through the side plates and the core plates with the core plates inserted between the side plates. The core plates may or may not project beyond a distal end of the tongue. The end of the guide bar body and the tail end of the nose assembly are held in abutment at a position spaced 90 mm or preferably more from a tip end of the nose assembly so that the guide bar body will not be adversely affected by hitting engagement with a saw chain.

6 Claims, 15 Drawing Figures from the opposite side edges of the tongue 6 and having a thickness substantially equal to the width of the rail grooves 5. The core plates 7 are formed by cutting off front and rear surfaces of the body 2. Each of the core plates 7 has a plurality of rivet holes 8.

The nose assembly 3 has a sprocket 10 sandwiched between two side plates 9 for rotation at a high speed. The side plates 9 have central recesses 11 defined in tail ends thereof and receiving the tongue 6 fitted therein. There is a gap between the side plates 9 at the tail ends thereof with the core plates 7 inserted in the gap. The side plates 9 have rivet holes 12 disposed on both sides of the recesses 11 in registration with the rivet holes 8 in the body 2. The side plates 9 have a length L which is 90 mm or greater. The tongue 6 has a front end 6A located as closely as possible to the sprocket 10, and the recesses 11 have a depth corresponding to the length of the tongue 6. In the first embodiment, the core plates 7 have front ends 7A which do not project beyond the front end 6A of the tongue 6.

For assembly, the tongue 6 of the body 2 is fitted into the recesses 11 in the nose assembly 3, the core plates 7 are inserted bewteen the side plates 9, and rivets 13 are fastened through the rivet holes 8, 12.

When wood is cut by a chain trained around the guide bar 1, the chain is lifted off the rail of the guide bar and hits a rail surface 3A of the nose assembly 3, but does not hit a rail surface 2A of the body 2. Therefore, the rail surface 2A of the body 2 will not be subjected to damage which would otherwise result from hitting engagement with the chain. When the nose assembly 3 undergoes a lateral load while cutting wood, the guide bar 1 tends to be bent by a bending moment applied. However, an abutting portion B of the front end 6A of the tongue 6 and the nose assembly 3 is positioned closely to the tip end of the nose assembly 3 while an abutting portion A of the body 2 and the nose assembly 3 is positioned 90 mm or more away from the tip end of the nose assembly 3. Thus, any bending moment applied to abutting portion B is small and the chain saw guide bar has an increased mechanical strength against the bending moment.

As shown in FIG. 4, the core plates 7 have widths m which are equal on the front and rear surfaces of the body 1. However, as shown in FIG. 5, a width m of one (on the righthand side) of the core plates 7 on the front surface may be smaller than a width n of the same core plate on the rear surface, and a width n of the other (on the lefthand side) core plate 7 on the front surface may be greater than a width m of the same core plate on the rear surface ($m<n$). With the arrangement of FIG. 4, the tongue 6 and the core plates 7 have abruptly changing cross-sectional areas, which tends to produce a large strain, such as upon quenching, resulting in a quenching crack. However, since there is no abrupt change in the cross-sectional area with the construction of FIG. 5, the latter has no danger of producing a large strain and a quenching crack.

2nd Embodiment

FIGS. 6 through 9 illustrate a chain saw guide bar according a second embodiment of the present invention. The chain saw guide bar, generally designated at 20, has a body 21 formed by cutting a single plate. The body 21 has rail grooves 22 defined longitudinally in opposite side edges, a central tongue 23 projecting from a distal end thereof, and core plates 24 extending laterally from the tongue 23 and having the same thickness as the width of the rail grooves 22. The core plates 24 are formed by cutting off front and rear surfaces of the body 21. Each of the core plates 24 has a plurality of rivet holes 25. A core plate 26 projects from an end of the tongue 23 which is attached to a nose assembly 28, the core plate 26 having the same thickness as that of the core plates 24. The core plate 26 has a central semi-spherical or semielliptical rivet hole 27.

The nose assembly 28 has a sprocket 30 sandwiched between two side plates 29 for rotation at a high speed. The side plates 29 have central recesses 31 defined in tail ends thereof for receiving the tongue 23 fitted therein. There is a gap between the side plates 29 at the tail ends thereof with the core plates 24, 26 inserted in the gap. The side plates 29 have rivet holes 32 disposed on both sides of the recesses 31 in registration with the rivet holes 25 in the body 21. An end of the core plate 26 for attachment to the nose assembly 28 is located closely to the sprocket 30. The side plates 29 also have circular rivet holes in registration with the rivet hole 27 in the core plate 26.

For assembly, the tongue 23 of the body 21 is fitted into the recesses 31 in the nose assembly 28, the core plates 24, 26 are inserted bewteen the side plates 29, and rivets 34 are fastened through the rivet holes 25, 32. In addition, a rivet 35 is fastened through the rivet holes 33 and the rivet hole 27.

The chain saw guide bar of the second embodiment operates in the same manner as the chain saw guide bar of the first embodiment as long as the hitting engagement of the chain with the rail surface is concerned. However, the chain saw guide bar has an increased mechanical strength against a bending moment. More specifically, since the core plate 26 projecting from the front end 23A of the tongue 23 toward the nose assembly 28 is fitted between the side plates 29, the body 21 has an increased mechanical strength. When a large bending moment is imposed on the nose assembly 28 tending to bend the same, the rivet 35 is displaced in the rivet hole 27 in the core plate 26, so that no large force will act on the core plate 26 because the rivet 35 will move in the rivet hole 27 under the applied bending moment.

Chain saw guide bars according to third through seventh embodiments will hereinafter be described. Since the chain saw guide bars of the third through seventh embodiments are substantially the same as those of the first and second embodiments, only different arrangements will be described and identical components will not be described.

3rd Embodiment

A third embodiment is shown in FIG. 10. Core plates 40 project from lateral sides of a tongue 38 of a body 37 of a chain saw guide bar 36 and from an end of the tongue 38 which faces a nose assembly 39. The core plate 40 facing the nose assembly 39 has an arcuate outer surface concave toward the center of core plate 40, and opposite sides projecting slightly outwardly as substantially triangular prongs 41. The core plate 40 facing the nose assembly 39 also has a central circular rivet hole 42. The nose assembly 39 has a rivet hole 44 disposed slightly inwardly from an inner edge of a recess 43 for registration with the rivet hole 42 in the body 37. When the nose assembly 39 is coupled to the body 37, the rivet holes 42, 44 are held in mutual registration, and a rivet is fastened therethrough.

CHAIN SAW GUIDE BAR

BACKGROUND OF THE INVENTION

The present invention relates to a chain saw guide bar.

Various chain saw guide bar constructions are known in the art. One known example is illustrated in FIG. 15 of the accompanying drawings. A nose assembly 72 replaceably connected by rivets to a guide bar body 71. More specifically, the guide bar body 71 has a pair of laterally spaced central tongues 73 with a recess 74 defined therebetween. The nose assembly 72 has a sprocket 76 rotatably sandwiched between two side plates 75 having recesses 77 defined in tail ends thereof and receiving the tongues 73 respectively therein. For interconnecting the guide bar body 71 and the nose assembly 72, the tail end of a spacer 78 is fitted into the recess 74, and the front end of the spacer 78 is inserted between the side plates 75, and the spacer 78 is secured by rivets 79 to the guide bar body 71 and the nose assembly 72.

The prior chain saw guide bar however has the following problems:

When a saw chain 80 trained around an outer peripheral surface of the guide bar rotates at a high speed in the direction of the arrow R, a portion of the chain 80 (below the guide bar in FIG. 15) tends to be lifted off the rail under centrifugal forces. When the lifted chain portion contacts the rail, it hits the rail strongly so that the rail will be worn rapidly. The position subjected to greatest wear is about 70 to 90 mm spaced from the tip end of the nose assembly 72. Where a rail 71A of the guide bar body 71 is in such position, the guide bar body 71 will be worn and damaged.

Generally, the guide bar body 71 has a service life about three times that of the nose assembly 72. Therefore, the guide bar body 71 is required to be replaced once while the nose assembly 72 is replaced three times. The nose assembly 72 is the component which wears at the greatest rate, and needs frequent replacements. If the rail 71A of the guide bar body 71 is also worn, then there will be a step produced between the guide bar body 71 and a new nose assembly 72 coupled thereto. When a portion of the chain 80, which is rotated at a high speed, is caught by the step, the chain 80 is quickly worn, and generates vibrations and noise. Consequently the new nose assembly 72, which has just replaced the old one, is liable to get damaged.

To prevent the chain 80 from hitting the rail 71A of the guide bar body 71, the nose assembly 72 would have to be elongated so that an abutting portion A of the guide bar body 71 and the nose assembly 72 would be positioned at a distance 90 mm or more away from the tip end of the nose assembly 72. However, if the nose assembly 72 were too long, an abutting portion of the tongues 73 and the nose assembly 72 would be subjected to a large bending moment when subjected to a large lateral load while cutting wood, with the result that the guide bar would be bent or broken at the abutting portion B.

SUMMARY OF THE INVENTION

It is an object of the present invention to provide a an improved chain saw guide bar which has a chain guide bar body free from wear due to hitting engagement with a chain and has an increased mechanical strength.

According to the present invention, a chain saw guide bar comprises a guide bar body and a nose assembly coupled to an end of the guide bar body, the guide bar body having a longitudinal tongue projecting centrally from an end thereof and thinner core plates extending coterminously with and laterally from opposite side edges of the tongue, the nose assembly being composed of a pair of side plates having recesses defined centrally in tail ends thereof and receiving the tongue fitted therein, the body and the nose assembly being coupled together by rivets inserted through the side plates and the core plates with the core plates inserted between the side plates. The core plates may or may not project beyond a distal end of the tongue. The end of the guide bar body and the tail end of the nose assembly are held in abutment at a position spaced 90 mm or preferably more from a tip end of the nose assembly so that the guide bar body will not be adversely affected by hitting engagement with a saw chain.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS

1st Embodiment

Figure 1:
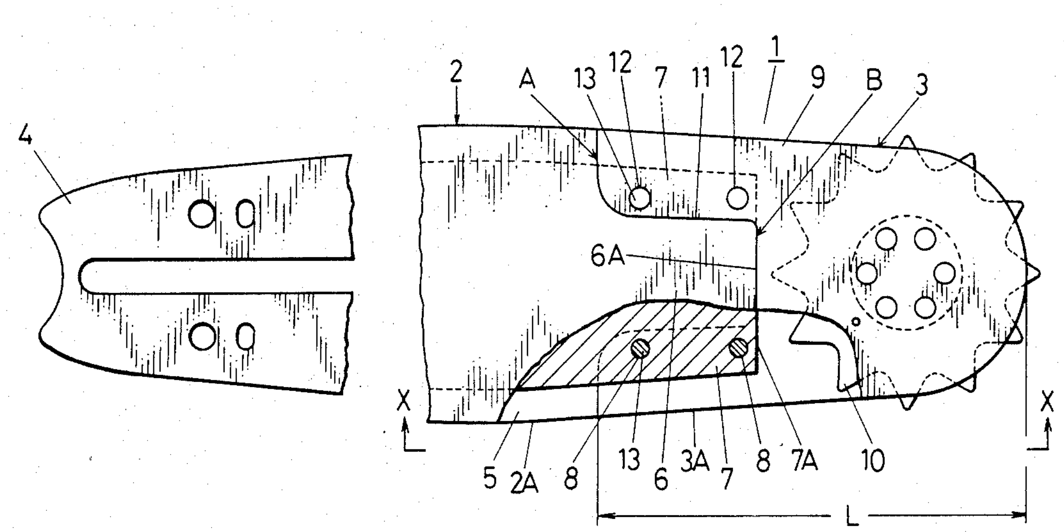
FIG. 1 is a front elevational view, partly cut away, of a chain saw guide bar according to a first embodiment of the present invention.
Figure 2:
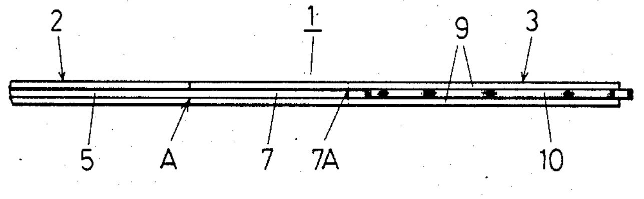
FIG. 2 is a side elevational view taken along line X—X of FIG. 1.
Figure 3:
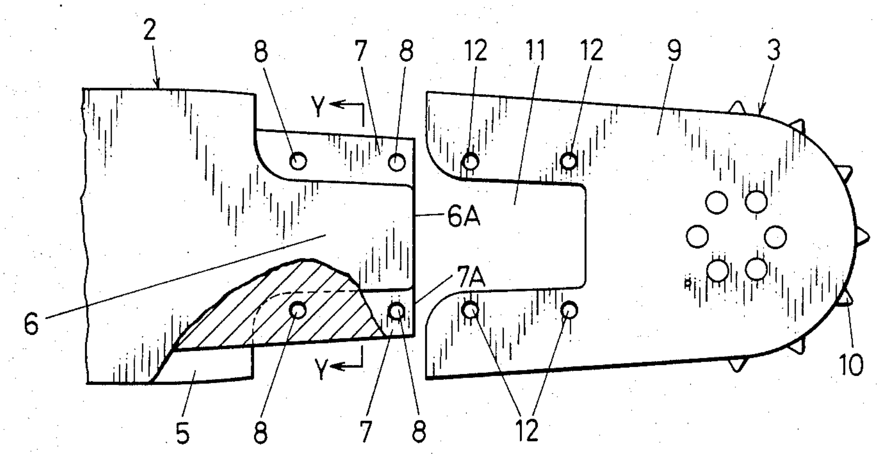
FIG. 3 is an exploded front elevational view of the chain saw guide bar of FIG. 1.
Figure 4:
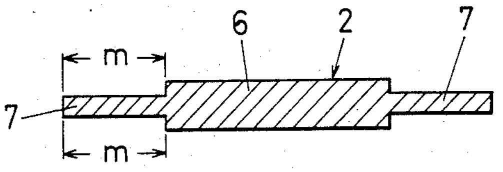
FIG. 4 is a cross-sectional view taken along line Y—Y of FIG. 3.
Figure 5:
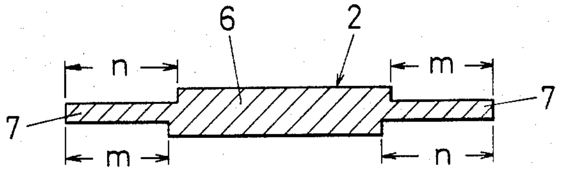
FIG. 5 is a view similar to FIG. 4, showing a modification thereof.
Figure 6:
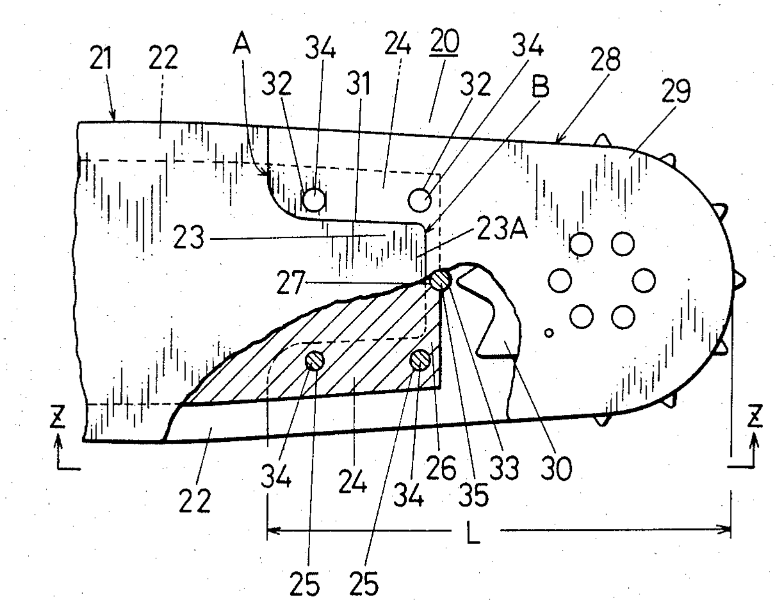
FIG. 6 is a front elevational view, partly broken away, of a chain saw guide bar according to a second embodiment of the present invention.
Figure 7:
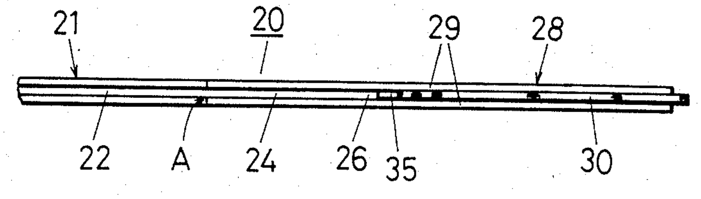
FIG. 7 is a side elevational view taken along line Z—Z of FIG. 6.
Figure 8:
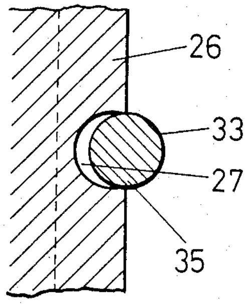
FIG. 8 is an enlarged fragmentary cross-sectional view of the chain saw guide bar of FIG. 6.
Figure 9:
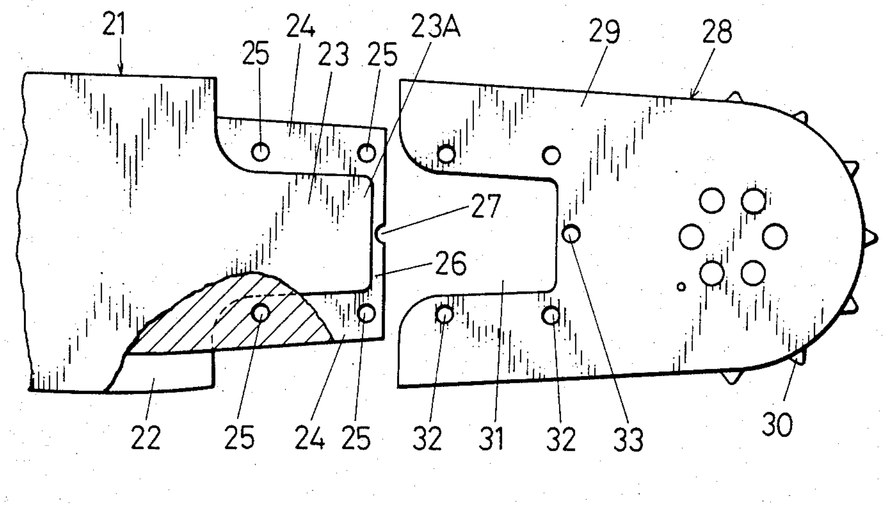
FIG. 9 is an exploded front elevational view of the chain saw guide bar of FIG. 6.
Figure 10:
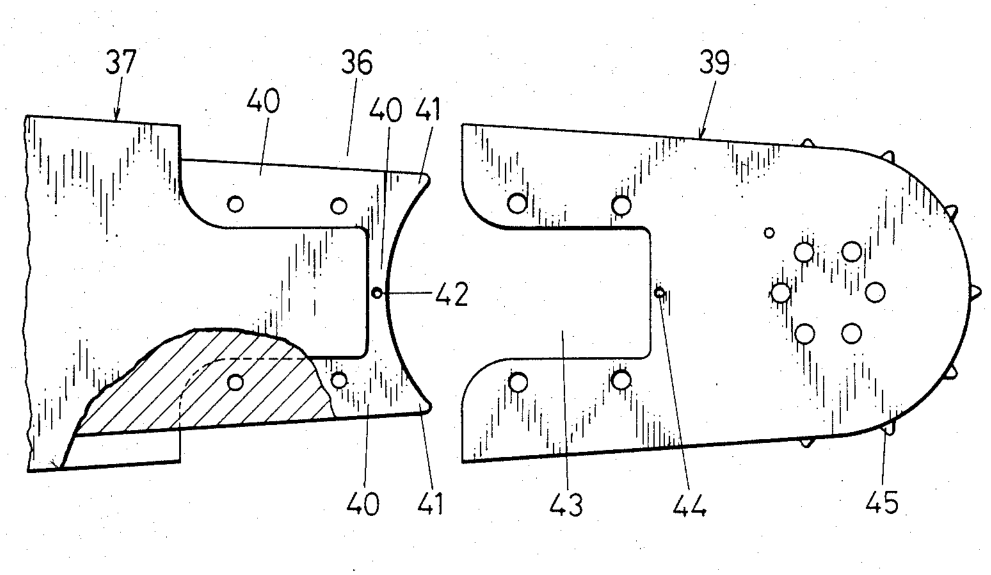
FIGS. 10 through 14 are exploded front elevational views of chain saw guide bars according to third through seventh embodiments of the present invention.

As shown in FIGS. 1 through 4, a chain saw guide bar 1 comprises a guide bar body 2 (hereinafter referred to as a "body") and a nose assembly 3 riveted to a distal end of the guide bar body 2.

The body 2 is fabricated by cutting a single plate, and has a joint 4 at a tail end for connection to a chain saw engine and longitudinal rail grooves 5 defined in opposite side edges. The body 2 also has a central tongue 6 projecting from the distal end thereof and having core plates 7 extending coterminously with and laterally Since the outer surface of the core plate 40 facing the nose assembly 39 is arcuate and concave toward the tongue 38 with the prongs 41 formed on the opposite sides of the core plate, the prongs 41 are positioned closely to a sprocket 45 of the nose assembly 39 when the latter is coupled to the body 37. The body 37 and the nose assembly 39 are coupled at positions close to an outer edge of the nose assembly 39, so that the chain saw guide bar of the third embodiment has a greater mechanical strength against bending moments than the chain saw guide bars of the first and second embodiments. With the rivet fastened in the rivet holes 42, 44 that are aligned, the rivet will not be displaced out of the rivet hole 42, unlike the second embodiment, and no large force will be imposed on the core plate 40 of the body 37 at the time a large bending moment is applied to the nose assembly 39.

4th Embodiment

Figure 11:
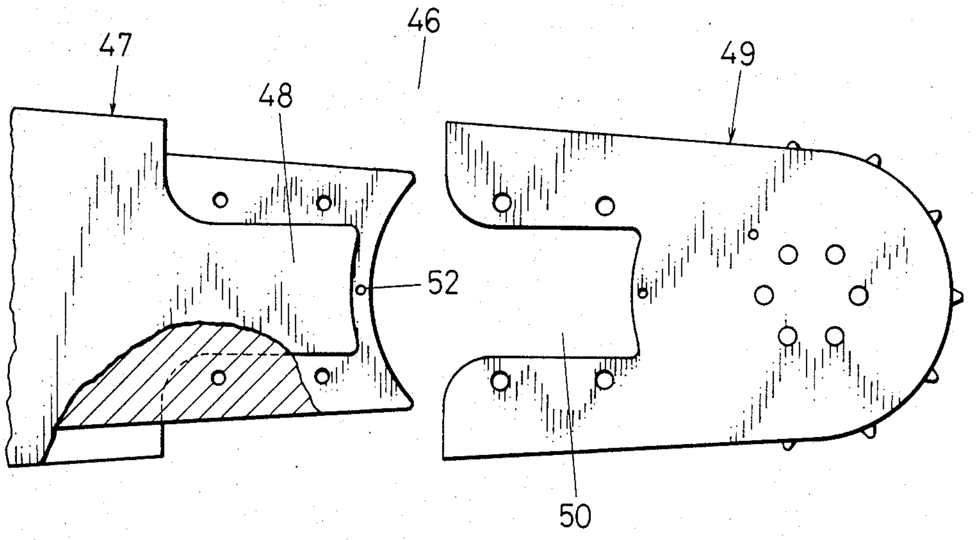

A fourth embodiment is illustrated in FIG. 11, and is slightly different from the third embodiment in that a tongue 48 of a body 47 of a chain saw guide bar 46 has an end facing a nose assembly 49 and having an arcuate surface which is concave toward the tongue 48. The nose assembly 49 has a recess 50 having an inner end with an arcuate surface convex toward the tongue 48 in complementary relation to the arcuate surface of the tongue 48. With the arcuate surface of the tongue 48 being concave, a core plate 51 projecting from the tongue 48 toward the nose assembly 49 can be widened in space, so that a rivet hole 52 can be defined easily in the core plate 51. The other arrangement is the same as the third embodiment, and will not be described.

5th Embodiment

Figure 12:
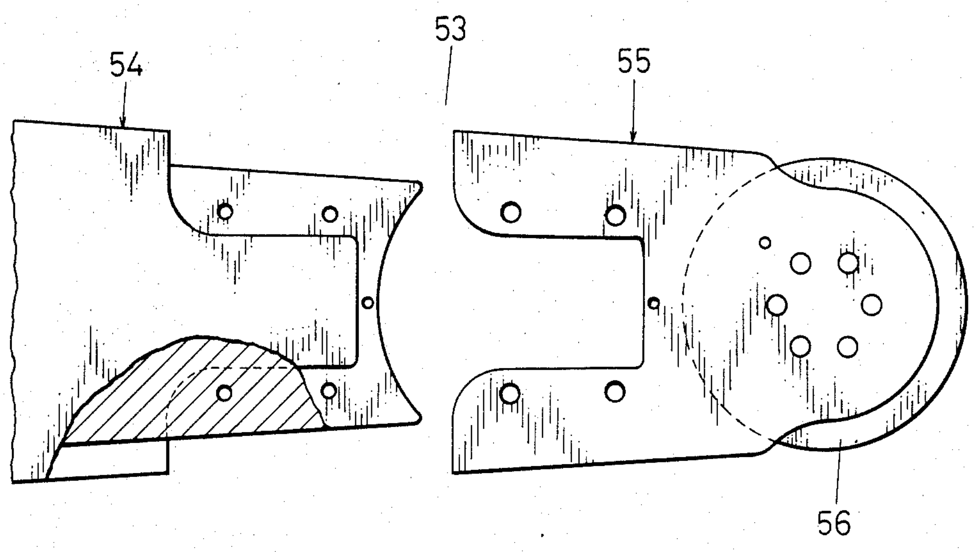

A fifth embodiment is shown in FIG. 12, and is essentially the same as the first through fourth embodiments. A chain saw guide bar 53 has a body 54 which is of the same construction as that of the third embodiment. A nose assembly 55 has a roller 56 as a chain support mechanism, instead of the sprocket according to the first through fourth embodiments. The present invention is therefore applicable to a chain saw guide bar including a nose assembly with a chain supporting roller.

6th Embodiment

Figure 13:
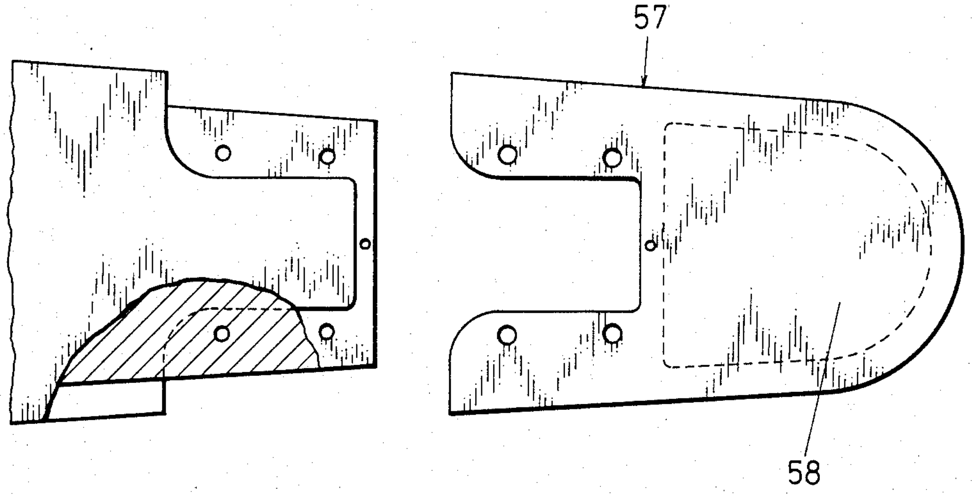

FIG. 13 illustrates a sixth embodiment which is a combination of the body according to the first and second embodiments and a nose assembly which is commercially known as a hard nose. The nose assembly, designated at 57, has a guide plate 58 fixed thereto as a chain support mechanism.

7th Embodiment

Figure 14:
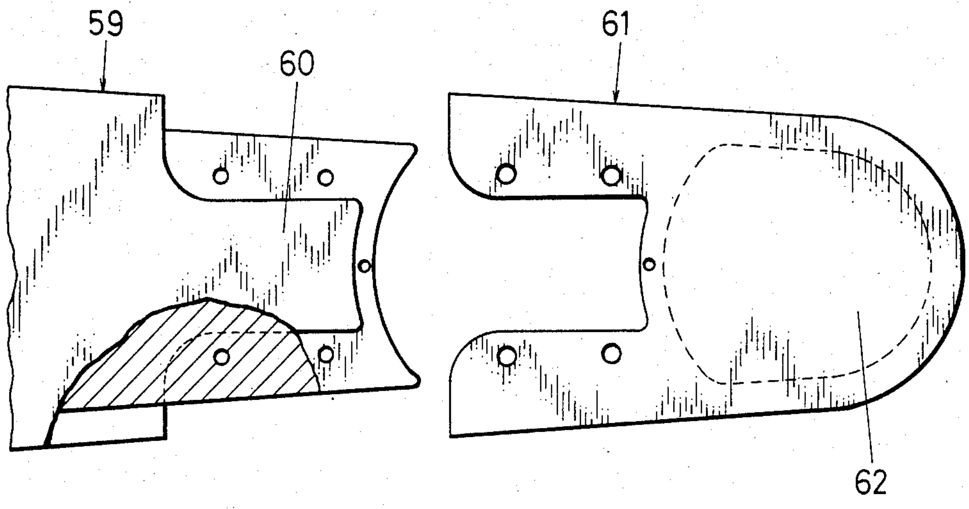
Figure 15:
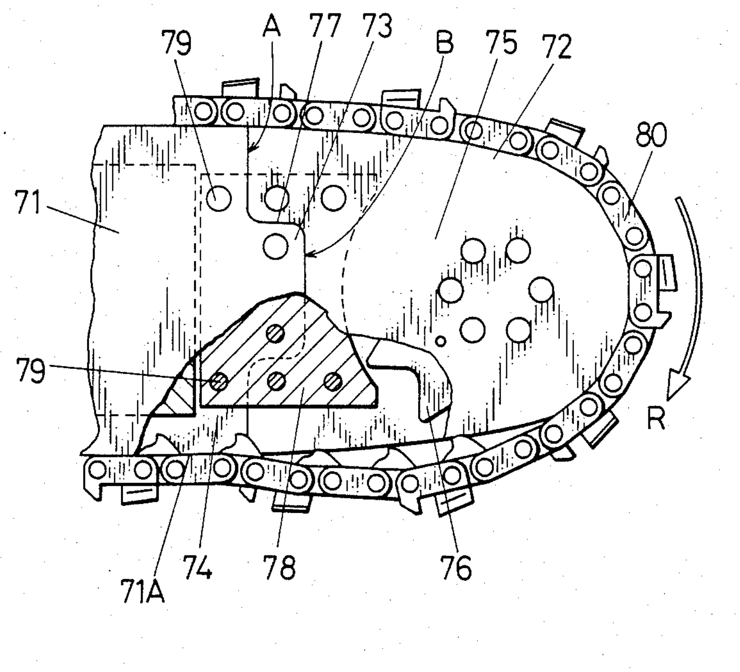
FIG. 15 is a fragmentary front elevational view, partly broken away, of a prior chain saw guide bar.

A seventh embodiment is shown in FIG. 14, and differs from the sixth embodiment in that a tongue 60 of a guide bar body 59 has an arcuate end surface facing a nose assembly 61 which is concave toward the tongue 60. A core plate projecting from the tongue 60 toward the nose assembly has an arcuate end surface concave toward the tongue 60. The nose assembly 61 has a guide plates 62 fixed thereto and has an arcuate end surface convex toward the tongue 60 in complementary relation to the arcuate end surface of the core plate projecting from the tongue 60. The nose assembly 61 is known as a hard nose, and the seventh embodiment indicates that the present invention is applicable to a nose assembly known as the hard nose.

Since the body in each of the first and second embodiments includes core plates formed by cutting a single plate, the tongue and the core plates are integral and have an increased mechanical strength. It is however possible to superpose two side plates having tongues and a core plate and then weld or rivet them together. Where the side plates and core plate are spot-welded at too small a spot pitch, a current tends to be divided and insufficient current flows so that the base metal will not sufficiently be melted and satisfactory welding cannot be achieved. Therefore, the plates should be spot-welded at necessary and required pitches. The spot-welded plates are therefore liable to have a mechanical strength much lower than that of the guide bar body composed of a single plate.

With the above arrangement, the chain saw guide bar of the invention has the following advantages:

(1) The body has a longer tongue than a conventional tongue with core plates extending laterally therefrom, and the nose assembly has a recess in which the tongue is fitted, the core plates being inserted between side plates of the nose assembly and riveted thereto. The length of the nose assembly can be selected as desired. By elongating the nose assembly, the chain as it rotates hits the rail surface of the nose assembly. Therefore, the rail surface of the body will not be worn severely, and the chain will rotate smoothly after the nose assembly has been replaced.

(2) The front end of the tongue is weakest to a lateral load applied. Since the conventional chain saw guide bar has the front end of the tongue positioned remotely from the tip end of the nose assembly, the prior art chain saw guide bar tends to be of an insufficient mechanical strength. With the chain saw guide bar of the invention, the front end of the tongue is closely positioned to the tip end of the nose assembly and hence the chain saw guide bar has an increased mechanical strength.

The conventional construction has been disadvantageous in that attempts to increase the mechanical strength result in positioning the junction between the body and the nose assembly too closely to the tip end of the latter, and, if the junction is thus positioned, then the rail on the body will be worn and the body will have a reduced service life. The present invention can solve these drawbacks.

(3) With the conventional chain saw guide bar, a spacer has been required to provide a long rail length. According to the invention, however, a spacer is not necessary, and the cost of manufacturing and assembling any spacer is not involved, resulting in a better economic advantage.

Although certain preferred embodiments have been shown and described, it should be understood that many changes and modifications may be made therein without departing from the scope of the appended claims.

What is claimed is:

1. A chain saw guide bar comprising a guide bar body and a nose assembly coupled to an end of said guide bar body, said guide bar body made from a single plate having a longitudinal tongue projecting centrally from an end thereof and a core-plate extending along the entire length of and extending a distance laterally from each opposite side edge of said tongue, said distance being less than the distance between said side edge and the outer edge of said bar body, each of said core plates having a thickness which is less than the thickness of said tongue and having rivet holes, said nose assembly being composed of a pair of spaced apart identically shaped side plates having tail ends on each plate of equal length, said length being greater than the point of greatest wear on said nose assembly, said side plates having recesses defined centrally in said tail ends thereof and receiving said tongue fitted therein with said core-plates being received between said side plates, said side plates having rivet holes defined therein on opposite sides of said recesses in registration with said rivet holes in said core-plates, said body and said nose assembly being coupled together by rivets inserted through said rivet holes in said side plates and said core-plates.

2. A chain saw guide bar according to claim 1, wherein said end of said guide bar body and said tail ends of said nose assembly are held in abutting engagement at a position spaced 90 mm or more from a tip end of said nose assembly.

3. A chain saw guide bar according to claim 1, wherein an additional core plate projects from an end of said tongue which faces said nose assembly and has an end having an arcuate surface concave toward the core plate.

4. A chain saw guide bar according to claim 1, wherein an additional core plate projects from an end of said tongue which faces said nose assembly and has a central rivet hole, said nose assembly having a rivet hole defined therein and spaced slightly inwardly from an inner end of said recesses in registration with said central rivet hole, said guide bar body and said nose assembly being coupled with each other with a rivet fastened through said central rivet hole and said last mentioned rivet hole in said nose assembly.

5. A chain saw guide bar according to claim 1, wherein said longitudinal tongue of said guide bar body which faces said nose assembly has an end having an arcuate surface concave toward the, guide bar body said recesses in said nose assembly having inner arcuate ends convex toward said tongue in complementary relation to said arcuate surface of said end of said tongue.

6. A chain saw guide bar according to claim 1, wherein the upper portion of the side edge of said tongue above said laterally projecting thinner core plate is offset from the lower portion of the side edge of said tongue, whereby there is a less abrupt change in the cross-sectional area of the joint between the tongue and the cores plates.

* * * * *